(No Model.)

D. W. HITCHCOCK & G. GREASBY.
CAR AXLE LUBRICATOR.

No. 304,324. Patented Sept. 2, 1884.

WITNESSES
C. W. Dashiell
E. G. Siggers

D. W. Hitchcock
George Greasby
INVENTORS
By C. A. Snow & Co.
Attorneys

UNITED STATES PATENT OFFICE.

DANIEL WILLIAM HITCHCOCK AND GEORGE GREASBY, OF OSKALOOSA, IOWA.

CAR-AXLE LUBRICATOR.

SPECIFICATION forming part of Letters Patent No. 304,324, dated September 2, 1884.

Application filed June 3, 1884. (No model.)

*To all whom it may concern:*

Be it known that we, DANIEL W. HITCHCOCK and GEORGE GREASBY, citizens of the United States, residing at Oskaloosa, in the county of Mahaska and State of Iowa, have invented a new and useful Car-Axle Lubricator, of which the following is a specification, reference being had to the accompanying drawings.

This invention has relation to car-axle lubricators; and it consists in the construction and novel arrangement of parts, as will be hereinafter fully described, and particularly pointed in the claim.

Figure 1:
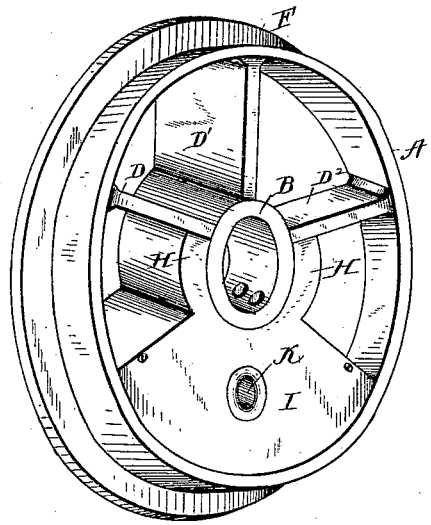
Figure 3:
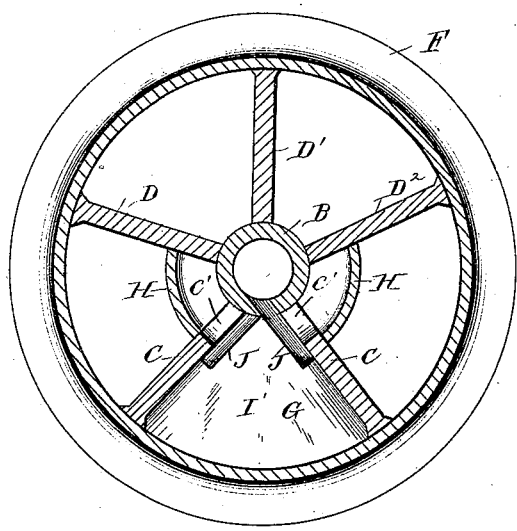
Figure 2:
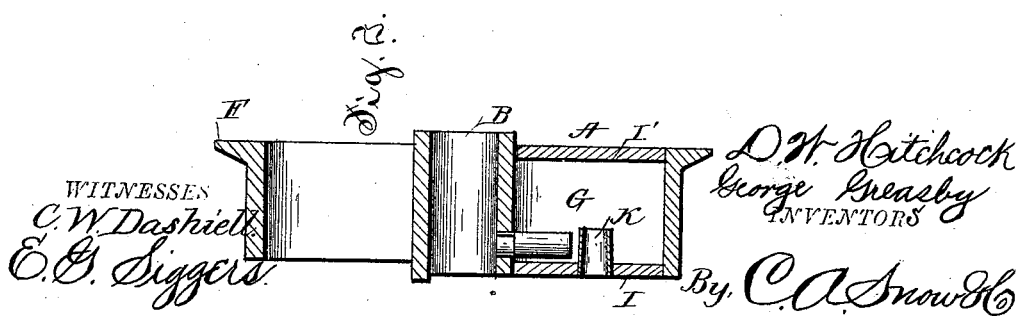

Figure 1 is a view in perspective of a car-wheel provided with our improved axle-lubricator. Fig. 2 is a vertical transverse section. Fig. 3 is a vertical section on a line around the tire of the wheel.

The object of the invention is to prevent the oil from wasting by escaping from the oil-receptacle while the wheel is standing still.

Referring by letter to the accompanying drawings, A designates the car-wheel, having the hub B and the flat radial spokes C C and D D' D$^2$. The spokes D D' D$^2$ extend the entire width of the tire E and flange F, while the spokes C C are the thickness of the side walls of the oil-receptacle G narrower. The spokes C C are provided with recesses C' C' at their inner ends, and are connected by arc-webs H H to the spokes D D', thereby forming inclosed spaces part way around the hub B when the side wall I is in place on the wheel. The side wall I' is cast with the wheel, but the side wall I is cast separately and bolted to place, or it can be cast with the wheel. The hub B is provided with one or more oil-tubes extending into the oil-receptacle. The number of tubes is varied to suit the quality of oil that is used for lubricating purposes. In this instance two oil-tubes, J J, are shown extending into the oil-receptacle G beyond the recesses C' C', one near each spoke C. The side wall I of the oil-receptacle G is provided with a filling-tube, K, which extends laterally into said receptacle. The oil cannot escape, no matter what position the wheels may stop in. The wheels are liable to stop in any position, but the oil will lie around the pipes, so that no more will run out than what is in the pipes in any position.

Having thus fully described our invention, what we claim as new, and desire to secure by Letters Patent of the United States, is—

A car-wheel having the spokes C C, recessed at C' C', and connected by arc-webs H H to the spokes D D$^2$, and inclosed by the side walls, I' I, the latter having the filling-tubes K and the oil-tubes J J, leading from the bore of the hub into the oil-receptacle G, substantially as specified.

In testimony that we claim the foregoing as our own we have hereto affixed our signatures in presence of two witnesses.

DANIEL WILLIAM HITCHCOCK.
GEORGE GREASBY.

Witnesses:
H. W. LEVERS,
W. A. LINDLY.